US009025064B2

(12) United States Patent
Aoki

(10) Patent No.: US 9,025,064 B2
(45) Date of Patent: May 5, 2015

(54) SOLID-STATE IMAGING DEVICE, IMAGING DEVICE, AND SIGNAL READOUT METHOD

(71) Applicant: Olympus Corporation, Tokyo (JP)

(72) Inventor: Jun Aoki, Tokyo (JP)

(73) Assignee: Olympus Corporation, Tokyo (JP)

(*) Notice: Subject to any disclaimer, the term of this patent is extended or adjusted under 35 U.S.C. 154(b) by 19 days.

(21) Appl. No.: 13/665,333

(22) Filed: Oct. 31, 2012

(65) Prior Publication Data

US 2013/0107093 A1    May 2, 2013

(30) Foreign Application Priority Data

Nov. 2, 2011    (JP) .................................. 2011-241372

(51) Int. Cl.
*H04N 5/3745* (2011.01)
*H04N 5/374* (2011.01)
*H04N 5/378* (2011.01)

(52) U.S. Cl.
CPC ........... *H04N 5/3745* (2013.01); *H04N 5/3742* (2013.01); *H04N 5/378* (2013.01)

(58) Field of Classification Search
CPC ....... H04N 5/341; H04N 5/369; H04N 5/374; H04N 5/3741; H04N 5/3742; H04N 5/3745; H04N 5/37452; H04N 5/378

USPC ............... 348/294, 300–302, 308; 250/208.1; 257/290, 291, 444

See application file for complete search history.

(56) References Cited

U.S. PATENT DOCUMENTS

| | | | | |
|---|---|---|---|---|
| 2006/0023109 A1* | 2/2006 | Mabuchi et al. | ............... | 348/340 |
| 2008/0284888 A1* | 11/2008 | Kobayashi | .................... | 348/308 |
| 2012/0057056 A1* | 3/2012 | Oike | ............................ | 348/294 |

FOREIGN PATENT DOCUMENTS

| | | |
|---|---|---|
| JP | 2006-49361 A | 2/2006 |
| JP | 2010-219339 A | 9/2010 |

* cited by examiner

*Primary Examiner* — Daniel M Pasiewicz
(74) *Attorney, Agent, or Firm* — Westerman, Hattori, Daniels & Adrian, LLP

(57) ABSTRACT

A solid-state imaging device includes: a pixel unit in which pixels each including a photoelectric conversion element are arrayed in a matrix form; a column circuit unit that includes a plurality of column processing circuits which are disposed in correspondence with columns of the pixels in the pixel unit; and an output unit that outputs a signal processed by the column processing circuit to the outside of the solid-state imaging device. The pixel unit is disposed in the $1^{st}$ substrate. The column circuit unit is disposed in each of at least two or more different substrates of the $1^{st}$ to $n^{th}$ substrates. The signal processing corresponding to the pixel of each column in the pixel unit is performed in a distributive manner by the column circuit units disposed in at least the two or more different substrates.

8 Claims, 8 Drawing Sheets

SOLID-STATE IMAGING DEVICE, IMAGING DEVICE, AND SIGNAL READOUT METHOD

BACKGROUND OF THE INVENTION

1. Technical Field

The present invention relates to a solid-state imaging device and an imaging device, in which $1^{st}$ to $n^{th}$ (where n is an integer equal to or greater than 2) substrates are electrically connected to each other via connection portions. The present invention also relates to a signal readout method of readout a signal from a pixel.

Priority is claimed on Japanese Patent Application No. 2011-241372, filed Nov. 2, 2011, the content of which is incorporated herein by reference.

2. Background Art

In recent years, video cameras, electronic still cameras, and the like have generally come into wide use. Charge coupled device (CCD)-type or amplification-type solid-state imaging devices have been used in such cameras. In the amplification-type solid-state imaging devices, signal charges generated and stored by photoelectric conversion units of pixels on which light is incident are guided toward amplification units installed in the pixels, and the signals amplified by the amplification units are output from the pixels. In the amplification-type solid-state imaging devices, a plurality of such pixels are arrayed in a two-dimensional matrix form. Examples of the amplification-type solid-state imaging device include a complementary metal oxide semiconductor (CMOS)-type solid-state imaging device that uses a CMOS transistor.

In the past, a general CMOS-type solid-state imaging device has utilized a method of sequentially readout signal charges generated by photoelectric conversion units of pixels arrayed in a two-dimensional matrix form from each row.

CMOS-type solid-state imaging devices having the global shutter function tend to be used for many uses. In the CMOS-type solid-state imaging devices according to the related art, after simultaneous exposure of all of the pixels, the signal charges generated by the photoelectric conversion units are simultaneously transmitted to the storage capacitors in all of the pixels and are stored once, and then the signal charges are sequentially converted into pixel signals to be read out at a predetermined readout timing.

A solid-state imaging device provided with a first substrate bonded with a second substrate is disclosed in Japanese Unexamined Patent Application, First Publication No. 2010-219339, and Japanese Unexamined Patent Application, First Publication No. 2006-49361, where a photoelectric conversion portion is formed in the first substrate and a MOS transistor is formed in the second substrate.

SUMMARY OF INVENTION

According to an aspect of the present invention, there is provided a solid-state imaging device in which $1^{st}$ to $n^{th}$ (where n is an integer equal to or greater than 2) substrates are electrically connected to each other via a connection portion. The solid-state imaging device includes: a pixel unit in which pixels each including a photoelectric conversion element are arrayed in a matrix form; a column circuit unit that includes a plurality of column processing circuits which are disposed in correspondence with columns of the pixels in the pixel unit and perform signal processing on a signal generated by the photoelectric conversion element included in the pixel of the corresponding column; and an output unit that outputs the signal processed by the column processing circuit to the outside of the solid-state imaging device. The pixel unit is disposed in the $1^{st}$ substrate. The column circuit unit is disposed in each of at least two or more different substrates of the $1^{st}$ to $n^{th}$ substrates. The signal processing corresponding to the pixel of each column in the pixel unit is performed in a distributive manner by the column circuit units disposed in each of at least the two or more different substrates.

According to another aspect of the present invention, there is provided a solid-state imaging device in which $1^{st}$ to $n^{th}$ (where n is an integer equal to or greater than 2) substrates are electrically connected to each other via a connection portion. The solid-state imaging device includes: a pixel unit in which pixels each including a photoelectric conversion element are arrayed in a matrix form; a column circuit unit that includes a plurality of column processing circuits which are disposed in correspondence with columns of the pixels in the pixel unit, are each connected to a column signal line connected to the pixel for each column in the pixel unit, and perform signal processing on a signal generated by the photoelectric conversion element included in the pixel of the corresponding column; an output unit that outputs the signal processed by the column processing circuit to the outside of the solid-state imaging device; and a changeover unit that is disposed between the column signal line and the column processing circuit and performs control of whether a signal is input to the column processing circuit. The pixel unit is disposed in the $1^{st}$ substrate. The column circuit unit is disposed in each of at least two or more different substrates of the $1^{st}$ to $n^{th}$ substrates.

According to still another aspect of the present invention, there is provided an imaging device in which $1^{st}$ to $n^{th}$ (where n is an integer equal to or greater than 2) substrates are electrically connected to each other via a connection portion. The solid-state imaging device includes: a pixel unit in which pixels each including a photoelectric conversion element are arrayed in a matrix form; a column circuit unit that includes a plurality of column processing circuits which are disposed in correspondence with columns of the pixels in the pixel unit and perform signal processing on a signal generated by the photoelectric conversion element included in the pixel of the corresponding column; and an output unit that outputs the signal processed by the column processing circuit to the outside of the solid-state imaging device, wherein the pixel unit is disposed in the $1^{st}$ substrate. The column circuit unit is disposed in each of at least two or more different substrates of the $1^{st}$ to $n^{th}$ substrates. The signal processing corresponding to the pixel of each column in the pixel unit is performed in a distributive manner by the column circuit units disposed in each of at least the two or more different substrates.

According to yet another aspect of the present invention, there is provided an imaging device in which $1^{st}$ to $n^{th}$ (where n is an integer equal to or greater than 2) substrates are electrically connected to each other via a connection portion. The solid-state imaging device includes: a pixel unit in which pixels each including a photoelectric conversion element are arrayed in a matrix form; a column circuit unit that includes a plurality of column processing circuits which are disposed in correspondence with columns of the pixels in the pixel unit, are each connected to a column signal line connected to the pixel for each column in the pixel unit, and perform signal processing on a signal generated by the photoelectric conversion element included in the pixel of the corresponding column; an output unit that outputs the signal processed by the column processing circuit to the outside of the solid-state imaging device; and a changeover unit that is disposed between the column signal line and the column processing circuit and performs control of whether a signal is input to the column processing circuit. The pixel unit is disposed in the $1^{st}$ substrate. The column circuit unit is disposed in each of at least two or more different substrates of the $1^{st}$ to $n^{th}$ substrates.

According to yet another aspect of the present invention, there is provided a signal readout method of readout a signal from each pixel of a solid-state imaging device in which $1^{st}$ to $n^{th}$ (where n is an integer equal to or greater than 2) substrates are electrically connected to each other via a connection portion, which includes a pixel unit in which the pixels each including a photoelectric conversion element are arrayed in a matrix form, a column circuit unit that includes a plurality of column processing circuits which are disposed in correspondence with columns of the pixels in the pixel unit, are each connected to a column signal line connected to the pixel for each column in the pixel unit, and perform signal processing on a signal generated by the photoelectric conversion element included in the pixel of the corresponding column, and an output unit that outputs the signal processed by the column processing circuit to the outside of the solid-state imaging device, and a switch that is disposed between the column signal line and the column processing circuit and performs control of whether the signal is input to the column processing circuit through changeover between power ON and power OFF, and in which the pixel unit is disposed in the $1^{st}$ substrate and the column circuit unit is disposed in each of at least two or more different substrates of the $1^{st}$ to $n^{th}$ substrates. The signal readout method includes: a step of causing the photoelectric conversion element to generate the signal; a step of inputting the signal generated by the photoelectric conversion element to the column processing circuit corresponding to the column of the pixel including the photoelectric conversion element via the switch; and a step of outputting the signal processed by the column processing circuit from the output unit to the outside of the solid-state imaging device.

DESCRIPTION OF EMBODIMENTS

Hereinafter, an embodiment of the present invention will be described with reference to the drawings. The following detailed description includes specific detailed contents as an example. Of course, those skilled in the art should understand that the detailed contents may be varied or modified and the variations and modifications of the contents are within the scope of the present invention. Accordingly, the various embodiments described below are only examples of the present invention described in the claims and do not limit the present invention described in the claims.

Figure 1:
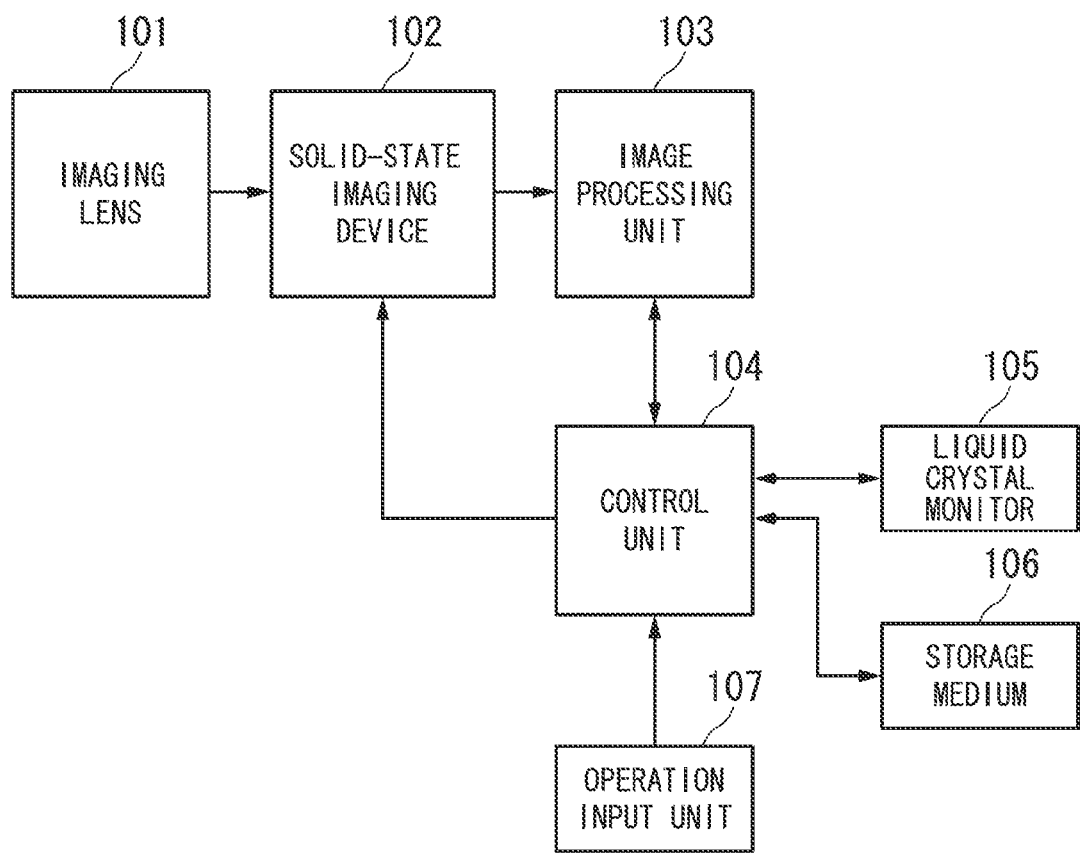
FIG. 1 is a block diagram illustrating the configuration of an imaging device according to an embodiment of the present invention.

FIG. 1 is a diagram illustrating the configuration of an imaging device according to this embodiment. The imaging device according to an aspect of the present invention may be an electronic device having an imaging function and may be a digital video camera, an endoscope, and the like in addition to a digital camera.

The imaging device shown in FIG. 1 includes an imaging lens 101, a solid-state imaging device 102, an image processing unit 103, a control unit 104, a liquid crystal monitor 105, a storage medium 106, and an operation input unit 107. Each block shown in FIG. 1 can be realized by various hardware components such as an electric circuit component such as a CPU or a memory of a computer, an optical component such as a lens, or an operation component such as a button or a switch. Each block can also be realized by software such as a computer program. Here, each block is illustrated as a functional block realized in association with the hardware and software. Accordingly, of course, those skilled in the art should understand that the functional blocks are realized in various forms by the combination of the hardware and software.

The imaging lens 101 forms a subject image formed by light from a subject on a two-dimensional pixel array disposed in the solid-state imaging device 102. The solid-state imaging device 102 outputs an image signal based on the subject image formed on the two-dimensional pixel array in which a plurality of pixels are arrayed. The image processing unit 103 has a function of performing signal processing such as color signal processing, gain processing, or white balance processing on the image signal output from the solid-state imaging device 102 to convert the image signal into a signal with a format which can be displayed on the liquid crystal monitor 105 or be stored in the storage medium 106.

The control unit 104 is electrically connected to each unit in the imaging device and controls the imaging device. A process of the control unit 104 is defined in a program stored in a ROM included in the imaging device. The control unit 104 reads out the program and performs various controls in accordance with the contents defined by the program. The liquid crystal monitor 105 displays an image based on the image signal processed by the image processing unit 103. The storage medium 106 stores image data based on the image signal processed by the image processing unit 103. The operation input unit 107 includes a button or a switch operated by a user. An operation result of the user is input as a signal to the control unit 104 via the operation input unit 107. For example, an instruction to set a photographing mode, perform shutter release of a still image, and start and stop photographing a moving image is performed via the operation input unit 107.

Figure 2A:
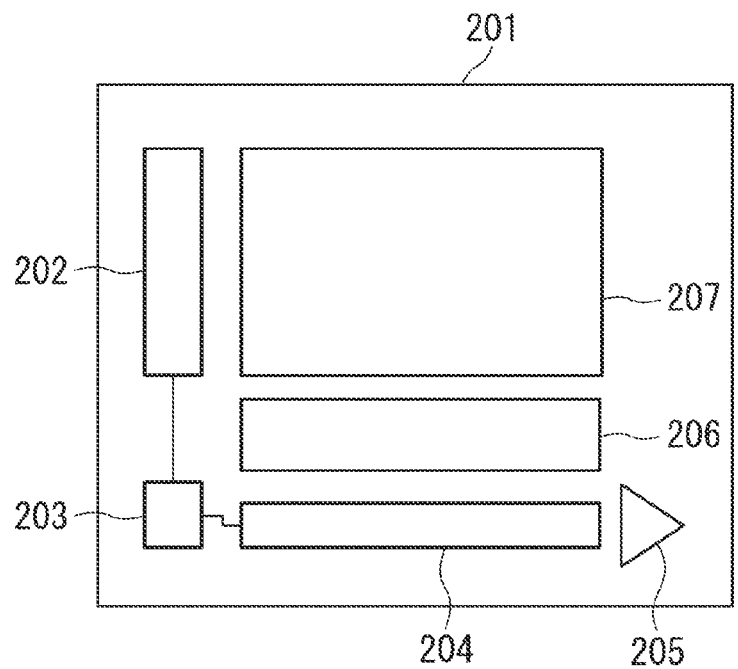
FIG. 2A is a block diagram illustrating the configuration of a solid-state imaging device of the imaging device according to the embodiment of the present invention.
Figure 2B:
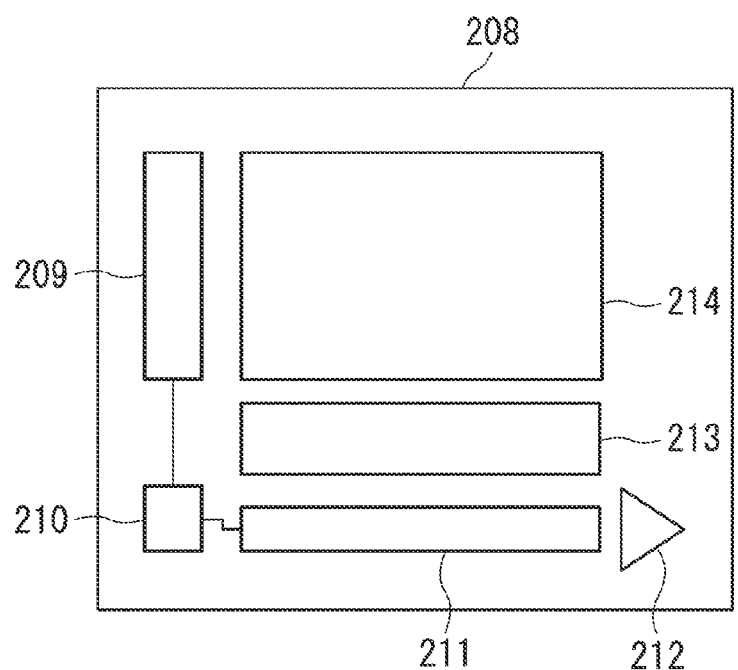
FIG. 2B is a block diagram illustrating the configuration of the solid-state imaging device of the imaging device according to the embodiment of the present invention.
Figure 3:
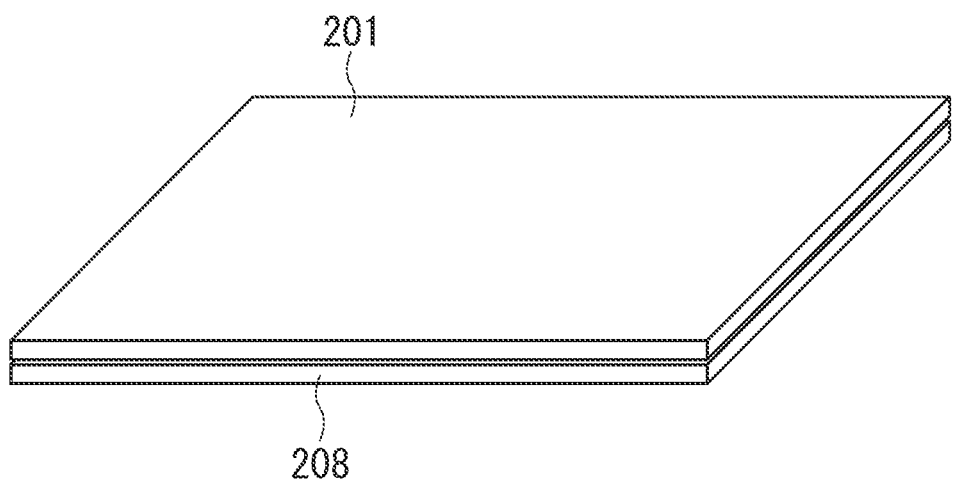
FIG. 3 is a diagram illustrating the outer appearance of the solid-state imaging device of the imaging device according to the embodiment of the present invention.

FIGS. 2A and 2B are diagrams illustrating the configuration of the solid-state imaging device 102. The solid-state imaging device 102 includes two substrates (a pixel substrate 201 and a circuit substrate 208) in which circuit components (photoelectric conversion elements, transistors, capacitors, and the like) of pixels and peripheral circuits peripheral to pixels are disposed. As shown in FIG. 3, the solid-state imaging device 102 has a configuration in which the pixel substrate 201 and the circuit substrate 208 overlap. The pixel substrate 201 and the circuit substrate 208 are electrically connected to each other so that electric signals are transmitted and received between the two substrates when the pixels are driven.

In the pixel substrate 201, as shown in FIGS. 2A and 2B, a first vertical scanning circuit 202, a first control signal generation unit 203, a first horizontal scanning circuit 204, a first output unit 205, a first column circuit unit 206, and a pixel array unit 207 are formed. In the circuit substrate 208, a second vertical scanning circuit 209, a second control signal generation unit 210, a second horizontal scanning circuit 211, a second output unit 212, a second column circuit unit 213, and a readout circuit array unit 214 are formed. The connection between the pixel substrate 201 and the circuit substrate 208 will be described below with reference to FIG. 4.

In the pixel array unit 207, the plurality of pixels (corresponding to pixel circuits 501 to be described below) are arrayed in a two-dimensional matrix form. The number of rows and the number of columns in the array of the pixels may be two or more. In this embodiment, a region formed by all of the pixels of the solid-state imaging device 102 is set as a readout target region of a pixel signal. However, part of the region formed by all of the pixels of the solid-state imaging device 102 may be set as the readout target region. The readout target region preferably includes all of the pixels of at least an effective pixel region. Further, the readout target region may include optical black pixels (pixels normally shielded from light) disposed outside the effective pixel region. A pixel signal readout from the optical black pixel is used, for example, to correct a dark-current component.

The first vertical scanning circuit 202 includes, for example, a shift resister and performs driving control on the pixels of the pixel array unit 207. The driving control includes a process of resetting the pixels and a process of transmitting signal charges. To perform the driving control, the first vertical scanning circuit 202 outputs a control signal (control pulse) to each pixel via a control signal line installed in each row and controls each pixel. A signal generated by the pixel array unit 207 is output to the readout circuit array unit 214 of the circuit substrate 208.

The readout circuit array unit 214 includes a memory that stores the signal output from the pixel array unit 207 and outputs the signal as a pixel signal to the first column circuit unit 206 and the second column circuit unit 213. The second vertical scanning circuit 209 includes, for example, a shift register, and performs driving control of readout circuits of the readout circuit array unit 214. The driving control includes a signal storing process, a signal readout process, and the like. To perform the driving control, the second vertical scanning circuit 209 outputs a control signal (control pulse) to each readout circuit via a control signal line disposed in each row and controls each readout circuit. The first column circuit unit 206 and the second column circuit unit 213 perform signal processing such as noise suppression (noise removal), amplification, and AD conversion on the pixel signal output from the readout circuit array unit 214.

The first horizontal scanning circuit 204 includes, for example, a shift register and controls the first column circuit unit 206 in units of columns. The first horizontal scanning circuit 204 controls readout of the pixel signal of each column by sequentially outputting the pixel signals from the first column circuit unit 206 to the first output unit 205. The first output unit 205 outputs the input pixel signal to the outside of the solid-state imaging device 102. The first control signal generation unit 203 generates a clock signal, a control signal, or the like serving as a reference of the processes of the first vertical scanning circuit 202, the first column circuit unit 206, and the first horizontal scanning circuit 204 and outputs the clock signal, the control signal, or the like to the first vertical scanning circuit 202, the first column circuit unit 206, and the first horizontal scanning circuit 204.

The second horizontal scanning circuit 211 includes, for example, a shift register and controls the second column circuit unit 213 in units of columns. The second horizontal scanning circuit 211 controls readout of the pixel signal of each column by sequentially outputting the pixel signals from the second column circuit unit 213 to the second output unit 212. The second output unit 212 outputs the input pixel signal to the outside of the solid-state imaging device 102. The second control signal generation unit 210 generates a clock signal, a control signal, or the like serving as a reference of the processes of the second vertical scanning circuit 209, the second column circuit unit 213, and the second horizontal scanning circuit 211 and outputs the clock signal, the control signal, or the like to the second vertical scanning circuit 209, the second column circuit unit 213, and the second horizontal scanning circuit 211.

Figure 4:
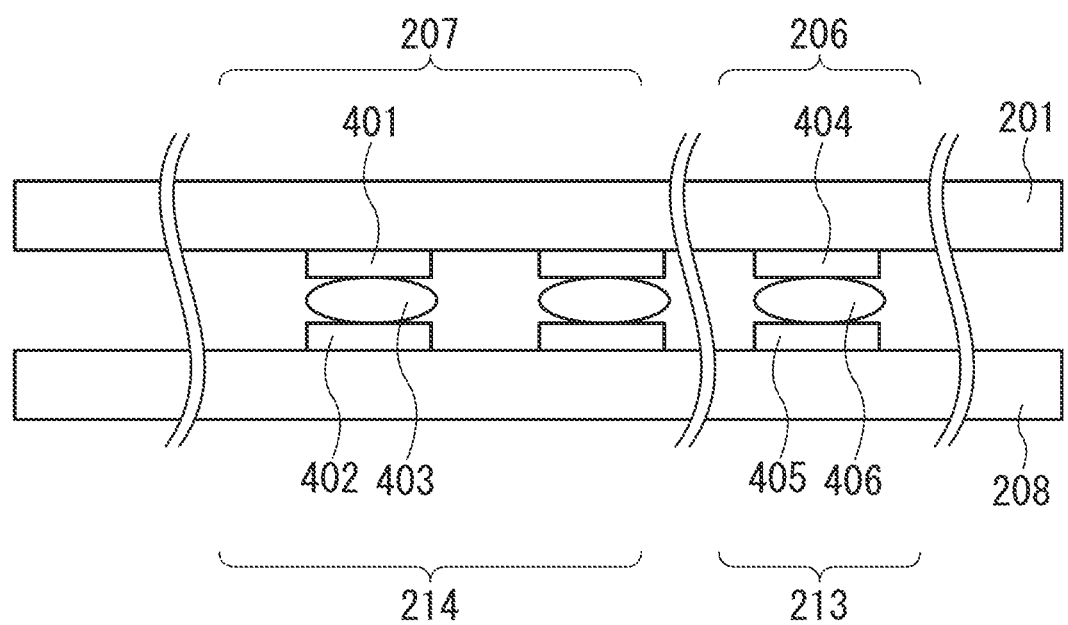
FIG. 4 is a cross-sectional view illustrating the solid-state imaging device of the imaging device according to the embodiment of the present invention.

FIG. 4 is diagram illustrating the cross-sectional configuration of the solid-state imaging device 102. Of two main surfaces (surfaces having a surface area relatively larger than side surfaces) of the pixel substrate 201, photoelectric conversion elements are formed on the main surface to which light is radiated. The light radiated to the pixel substrate 201 is incident on the photoelectric conversion elements. The photoelectric conversion elements are included in the pixel array unit 207. Of the two main surfaces of the pixel substrate 201, electrodes 401 and 404 for connection to the circuit substrate 208 are formed on the main surface opposite the main surface to which light is radiated. The electrodes 401 are arrayed in the pixel array unit 207 and the electrodes 404 are arrayed in the first column circuit unit 206. Further, of two main surfaces of the circuit substrate 208, electrodes 402 and 405 for connection to the pixel substrate 201 are formed at positions that correspond to the electrodes 401 and 404 on the main surface facing the pixel substrate 201. The electrodes 402 are arrayed in the readout circuit array unit 214 and the electrodes 405 are arrayed in the second column circuit unit 213.

A microbump 403 is formed between the electrode 401 of the pixel substrate 201 and the electrode 402 of the circuit substrate 208. A microbump 406 is formed between the electrode 404 of the pixel substrate 201 and the electrode 405 of the circuit substrate 208. The pixel substrate 201 and the circuit substrate 208 overlap such that the electrodes 401 face the electrodes 402 and the electrodes 404 face the electrodes 405. The pixel substrate 201 and the circuit substrate 208 are integrated with each other to be electrically connected by the microbumps 403 between the electrodes 401 and 402 and to be electrically connected by the microbumps 406 between the electrodes 404 and 405. The electrode 401, the electrode 402, and the microbump 403 form a connection portion that connects the pixel substrate 201 to the circuit substrate 208, and the electrode 404, the electrode 405, and the microbump 406 form a connection portion that connects the pixel substrate 201 to the circuit substrate 208. A signal is transmitted and received via the connection portion between the pixel substrate 201 and the circuit substrate 208.

Figure 5:
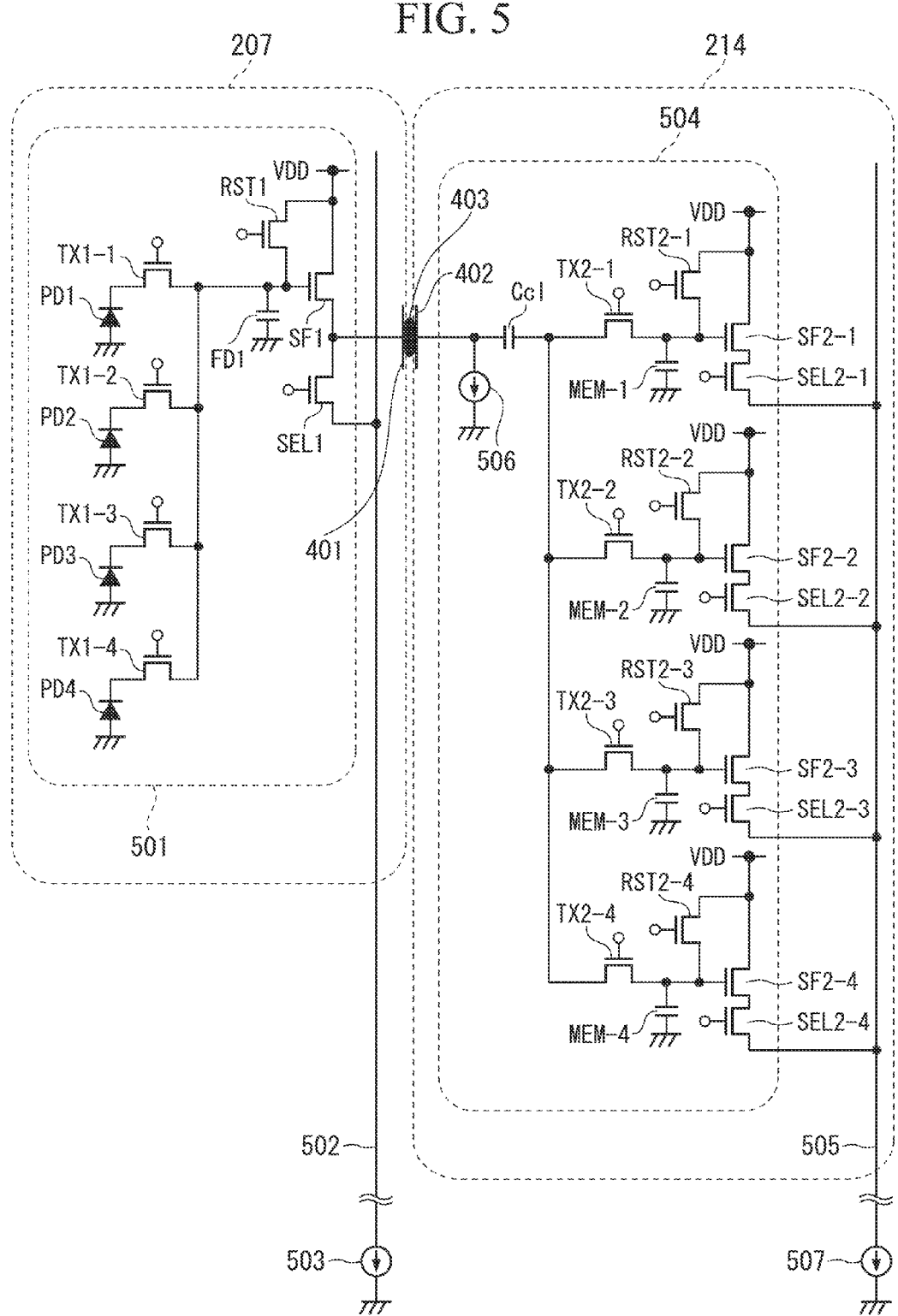
FIG. 5 is a circuit diagram illustrating the circuit configurations of a pixel array unit and a readout circuit array unit in the solid-state imaging device of the imaging device according to the embodiment of the present invention.

FIG. 5 is a diagram illustrating the detailed configurations of the pixel array unit 207 and the readout circuit array unit 214.

FIG. 5 shows the configurations of four unit pixel circuits included in the pixel array unit 207 and four unit readout circuits included in the readout circuit array unit 214. The four unit pixel circuits shown in FIG. 5 are part of the unit pixel circuits included in the pixel array unit 207. The four unit readout circuits shown in FIG. 5 are part of the unit readout circuits included in the readout circuit array unit 214. A plurality of sets of four unit pixel circuits shown in FIG. 5 are disposed in the pixel array unit 207 and a plurality of sets of four unit readout circuits shown in FIG. 5 are disposed in the readout circuit array unit 214.

The pixel circuit 501 forms the pixel array unit 207. The pixel circuit 501 includes photoelectric conversion elements PD1, PD2, PD3, and PD4, first transfer transistors TX1-1, TX1-2, TX1-3, and TX1-4, a charge retention unit FD1 (floating diffusion), a first reset transistor RST1, a first amplification transistor SF1, and a first select transistor SELL. One unit pixel circuit is formed by one photoelectric conversion element, one first transfer transistor, the charge retention unit FD1, the first reset transistor RST1, the first amplification transistor SF1, and the first select transistor SEL1.

The four unit pixel circuits share the charge retention unit FD1, the first reset transistor RST1, the first amplification transistor SF1, and the first select transistor SEL1 (hereinafter, these circuit elements are referred to as a first shared circuit).

The photoelectric conversion element PD1, the first transfer transistor TX1-1, and the first shared circuit form a first unit pixel circuit. The photoelectric conversion element PD2, the first transfer transistor TX1-2, and the first shared circuit form a second unit pixel circuit. The photoelectric conversion element PD3, the first transfer transistor TX1-3, and the first shared circuit form a third unit pixel circuit. The photoelectric conversion element PD4, the first transfer transistor TX1-4, and the first shared circuit form a fourth unit pixel circuit.

In the pixel substrate 201, the pixel circuits 501 are arrayed in a two-dimensional matrix form. In this embodiment, one pixel circuit 501 corresponds to one pixel. In this embodiment, the plurality of unit pixel circuits share the charge retention unit FD1, the first reset transistor RST1, the first amplification transistor SF1, and the first select transistor SEL1. However, each unit pixel circuit may include the charge retention unit FD1, the first reset transistor RST1, the first amplification transistor SF1, and the first select transistor SEL1. In this case, each unit pixel circuit corresponds to one pixel. The pixel circuit 501 is electrically connected to the readout circuit 504 via the electrode 401, the microbump 403, and the electrode 402. Further, the pixel circuit 501 is connected to a vertical signal line 502 disposed in each column in the array of the pixel circuit 501. The vertical signal line 502 is connected to a first current source 503.

The readout circuit 504 forms the readout circuit array unit 214. The readout circuit 504 includes a clamp capacitor Cc1, a second current source 506, second transfer transistors TX2-1, TX2-2, TX2-3, and TX2-4, second reset transistors RST2-1, RST2-2, RST2-3, and RST2-4, analog memories MEM-1, MEM-2, MEM-3, and MEM-4, second amplification transistors SF2-1, SF2-2, SF2-3, and SF2-4, and second select transistors SEL2-1, SEL2-2, SEL2-3, and SEL2-4. One unit readout circuit is formed by one second transfer transistor, one second reset transistor, one analog memory, one second amplification transistor, one second select transistor, the clamp capacitor Cc1, and the second current source 506. The four unit readout circuits share the clamp capacitor Cc1 and the second current source 506 (hereinafter, the circuit elements are referred to as a second shared circuit).

The second transfer transistor TX2-1, the second reset transistor RST2-1, the analog memory MEM-1, the second amplification transistor SF2-1 the second select transistor SEL2-1, and the second shared circuit form a first unit readout circuit. The second transfer transistor TX2-2, the second reset transistor RST2-2, the analog memory MEM-2, the second amplification transistor SF2-2, the second select transistor SEL2-2, and the second shared circuit form a second unit readout circuit. The second transfer transistor TX2-3, the second reset transistor RST2-3, the analog memory MEM-3, the second amplification transistor SF2-3, the second select transistor SEL2-3, and the second shared circuit form a third unit readout circuit. The second transfer transistor TX2-4, the second reset transistor RST2-4, the analog memory MEM-4, the second amplification transistor SF2-4, the second select transistor SEL2-4, and the second shared circuit form a fourth unit readout circuit.

In the circuit substrate 208, the readout circuits 504 are arrayed in a two-dimensional matrix form. In this embodiment, the plurality of unit readout circuits share the clamp capacitor Cc1 and the second current source 506, but each unit pixel circuit may include the clamp capacitor Cc1 and the second current source 506. The readout circuit 504 is connected to a vertical signal line 505 disposed in each column in the array of the readout circuit 504. The vertical signal line 505 is connected to a third current source 507.

In this embodiment, the first unit pixel circuit can correspond to the first unit readout circuit, the second unit pixel circuit can correspond to the second unit readout circuit, the third unit pixel circuit can correspond to the third unit readout circuit, and the fourth unit pixel circuit can correspond to the fourth unit readout circuit.

One ends of the photoelectric conversion elements PD1, PD2, PD3, and PD4 are grounded. The drain terminals of the first transfer transistors TX1-1, TX1-2, TX1-3, and TX1-4 are connected to the other ends of the photoelectric conversion elements PD1, PD2, PD3, and PD4. The gate terminals of the first transfer transistors TX1-1, TX1-2, TX1-3, and TX1-4 are connected to the first vertical scanning circuit 202.

One end of the charge retention unit FD1 is connected to the source terminals of the first transfer transistors TX1-1, TX1-2, TX1-3, and TX1-4 and the other end of the charge retention unit FD1 is grounded. The drain terminal of the first reset transistor RST1 is connected to a power supply voltage VDD. The source terminal of the first reset transistor RST1 is connected to the source terminals of the first transfer transistors TX1-1, TX1-2, TX1-3, and TX1-4. The gate terminal of the first rest transistor RST1 is connected to the first vertical scanning circuit 202.

The drain terminal of the first amplification transistor SF1 is connected to the power supply voltage VDD. A gate terminal which is an input portion of the first amplification transistor SF1 is connected to the source terminals of the first transfer transistors TX1-1, TX1-2, TX1-3, and TX1-4. The drain terminal of the first select transistor SEL1 is connected to the source terminal of the first amplification transistor SF1 and the source terminal of the first select transistor SEL1 is connected to the vertical signal line 502. The gate terminal of the first select transistor SEL1 is connected to the first vertical scanning circuit 202.

One end of the clamp capacitor Cc1 is connected to the source terminal of the first amplification transistor SF1 and one end of the second current source 506. The drain terminals of the second transfer transistors TX2-1, TX2-2, TX2-3, and TX2-4 are connected to the other end of the clamp capacitor Cc1. The gate terminals of the second transfer transistors TX2-1, TX2-2, TX2-3, and TX2-4 are connected to the second vertical scanning circuit 209. The drain terminals of the second reset transistors RST2-1, RST2-2, RST2-3, and RST2-4 are connected to the power supply voltage VDD. The source terminals of the second reset transistors RST2-1, RST2-2, RST2-3, and RST2-4 are connected to the source terminals of the second transfer transistors TX2-1, TX2-2, TX2-3, and TX2-4. The gate terminals of the second reset transistors RST2-1, RST2-2, RST2-3, and RST2-4 are connected to the second vertical scanning circuit 209.

One ends of the analog memories MEM-1, MEM-2, MEM-3, and MEM-4 are connected to the source terminals of the second transfer transistors TX2-1, TX2-2, TX2-3, and TX2-4 and the other ends of the analog memories MEM-1, MEM-2, MEM-3, and MEM-4 are grounded. The drain terminals of the second amplification transistors SF2-1, SF2-2, SF2-3, and SF2-4 are connected to the power supply voltage VDD. The gate terminals forming the input portions of the second amplification transistors SF2-1, SF2-2, SF2-3, and SF2-4 are connected to the source terminals of the second transfer transistors TX2-1, TX2-2, TX2-3, and TX2-4. The drain terminals of the second select transistors SEL2-1, SEL2-2, SEL2-3, and SEL2-4 are connected to the source terminals of the second amplification transistors SF2-1, SF2-2, SF2-3, and SF2-4 and the source terminals of the second select transistors SEL2-1, SEL2-2, SEL2-3, and SEL2-4 are connected to the vertical signal line 505. The gate terminals of the second select transistors SEL2-1, SEL2-2, SEL2-3, and SEL2-4 are connected to the second vertical scanning circuit 209. The polarity of each transistor described above may be reversed, and thus the source terminal and the drain terminal of each transistor may be reversed.

The photoelectric conversion elements PD1, PD2, PD3, and PD4 are, for example, photodiodes, and produce (generate) signal charges based on incident light and retain and store the produced (generated) signal charges. The first transfer transistors TX1-1, TX1-2, TX1-3, and TX1-4 are transistors that transmit the signal charges stored in the photoelectric conversion elements PD1, PD2, PD3, and PD4 to the charge retention unit FD1. The power ON and OFF of the first transfer transistors TX1-1, TX1-2, TX1-3, and TX1-4 is controlled by the control pulse from the first vertical scanning circuit 202. The charge retention unit FD1 is a floating diffusion capacitor that temporarily retains and stores the signal charges transmitted from the photoelectric conversion elements PD1, PD2, PD3, and PD4.

The first reset transistor RST1 is a transistor that resets the charge retention unit FD1. The power ON and OFF of the first reset transistor RST1 is controlled by the control pulse from the first vertical scanning circuit 202. The photoelectric conversion elements PD1, PD2, PD3, and PD4 can also be reset by simultaneously turning on the first reset transistor RST1 and the first transfer transistors TX1-1, TX1-2, TX1-3, and TX1-4. The reset of the charge retention unit FD1 and the photoelectric conversion elements PD1, PD2, PD3, and PD4 means controlling the amount of charge stored in the charge retention unit FD1 and the photoelectric conversion elements PD1, PD2, PD3, and PD4 and setting the states (potentials) of the charge retention unit FD1 and the photoelectric conversion elements PD1, PD2, PD3, and PD4 to enter a reference state (a reference potential and a reset level).

The first amplification transistor SF1 is a transistor that outputs an amplified signal, which is obtained by amplifying a signal which is input to the gate terminal and is based on the signal charge stored in the charge retention unit FD1, from the source terminal. The first amplification transistor SF1 and the second current source 506 form a source follower circuit.

The first amplification transistor SF1 and the first current source 503 form a source follower circuit.

The first select transistor SEL1 is a transistor that selects the pixel circuit 501 and delivers the output of the first amplification transistor SF1 to the vertical signal line 502. The power ON and OFF of the first select transistor SEL1 is controlled by the control pulse from the first vertical scanning circuit 202. In this embodiment, the amplified signal output from the source terminal of the first amplification transistor SF1 can be output to the vertical signal line 502 via the first select transistor SEL1.

The clamp capacitor Cc1 is a capacitor that clamps (fixes) a voltage level of the amplified signal output from the first amplification transistor SF1. The second transfer transistors TX2-1, TX2-2, TX2-3, and TX2-4 are transistors that sample and hold the voltage level of the other end of the clamp capacitor Cc1 and store the voltage level in the analog memories MEM-1, MEM-2, MEM-3, and MEM-4. The power ON and OFF of the second transfer transistors TX2-1, TX2-2, TX2-3, and TX2-4 is controlled by the control pulse from the second vertical scanning circuit 209.

The second reset transistors RST2-1, RST2-2, RST2-3, and RST2-4 are transistors that reset the analog memories MEM-1, MEM-2, MEM-3, and MEM-4. The power ON and OFF of the second reset transistors RST2-1, RST2-2, RST2-3, and RST2-4 is controlled by the control pulse from the second vertical scanning circuit 209. The reset of the analog memories MEM-1, MEM-2, MEM-3, and MEM-4 means controlling the amount of charge stored in the analog memories MEM-1, MEM-2, MEM-3, and MEM-4 and setting the states (potentials) of the analog memories MEM-1, MEM-2, MEM-3, and MEM-4 to enter a reference state (a reference potential or a reset level). The analog memories MEM-1, MEM-2, MEM-3, and MEM-4 retain and store analog signals sampled and held by the second transfer transistors TX2-1, TX2-2, TX2-3, and TX2-4.

The capacitances of the analog memories MEM-1, MEM-2, MEM-3, and MEM-4 are set to be larger than the capacitance of the charge retention unit FD1. A metal insulator metal (MIM) capacitor or a metal oxide semiconductor (MOS) capacitor which is a capacitor with a small leakage current (dark current) per unit area is preferably used in the analog memories MEM-1, MEM-2, MEM-3, and MEM-4. Thus, resistance against noise is improved, and thus a high-quality signal can be obtained.

The second amplification transistors SF2-1, SF2-2, SF2-3, and SF2-4 are transistors that output amplified signals obtained by amplifying signals which are input to the gate terminals and are based on the signal charges stored in the analog memories MEM-1, MEM-2, MEM-3, and MEM-4, from the source terminals. The second amplification transistors SF2-1, SF2-2, SF2-3, and SF2-4 and the third current source 507 form a source follower circuit. The second select transistors SEL2-1, SEL2-2, SEL2-3, and SEL2-4 are transistors that select a unit readout circuit of the readout circuit 504 and deliver the outputs of the second amplification transistors SF2-1, SF2-2, SF2-3, and SF2-4 to the vertical signal line 505. The power ON and OFF of the second select transistors SEL2-1, SEL2-2, SEL2-3, and SEL2-4 is controlled by the control pulse from the second vertical scanning circuit 209.

In FIG. 5, the connection portion formed by the electrode 401, the electrode 402, and the microbump 403 is disposed in a path between the source terminal of the first amplification transistor SF1, and one end of the second current source 506 and one end of the clamp capacitor Cc1, but the embodiment of the present invention is not limited thereto. The connection portions may be disposed at any position on electrically connected paths from the first transfer transistors TX1-1, TX1-2, TX1-3, and TX1-4 to the second transfer transistors TX2-1, TX2-2, TX2-3, and TX2-4.

For example, the connection portions may be disposed in paths between the source terminals of the first transfer transistors TX1-1, TX1-2, TX1-3, and TX1-4, and one end of the charge retention unit FD1, the source terminal of the first rest transistor RST1, and the gate terminal of the first amplification transistor SF1. Alternatively, the connection portions may be disposed in paths between the other end of the clamp capacitor Cc1 and the drain terminals of the second transfer transistors TX2-1, TX2-2, TX2-3, and TX2-4.

Figure 6:
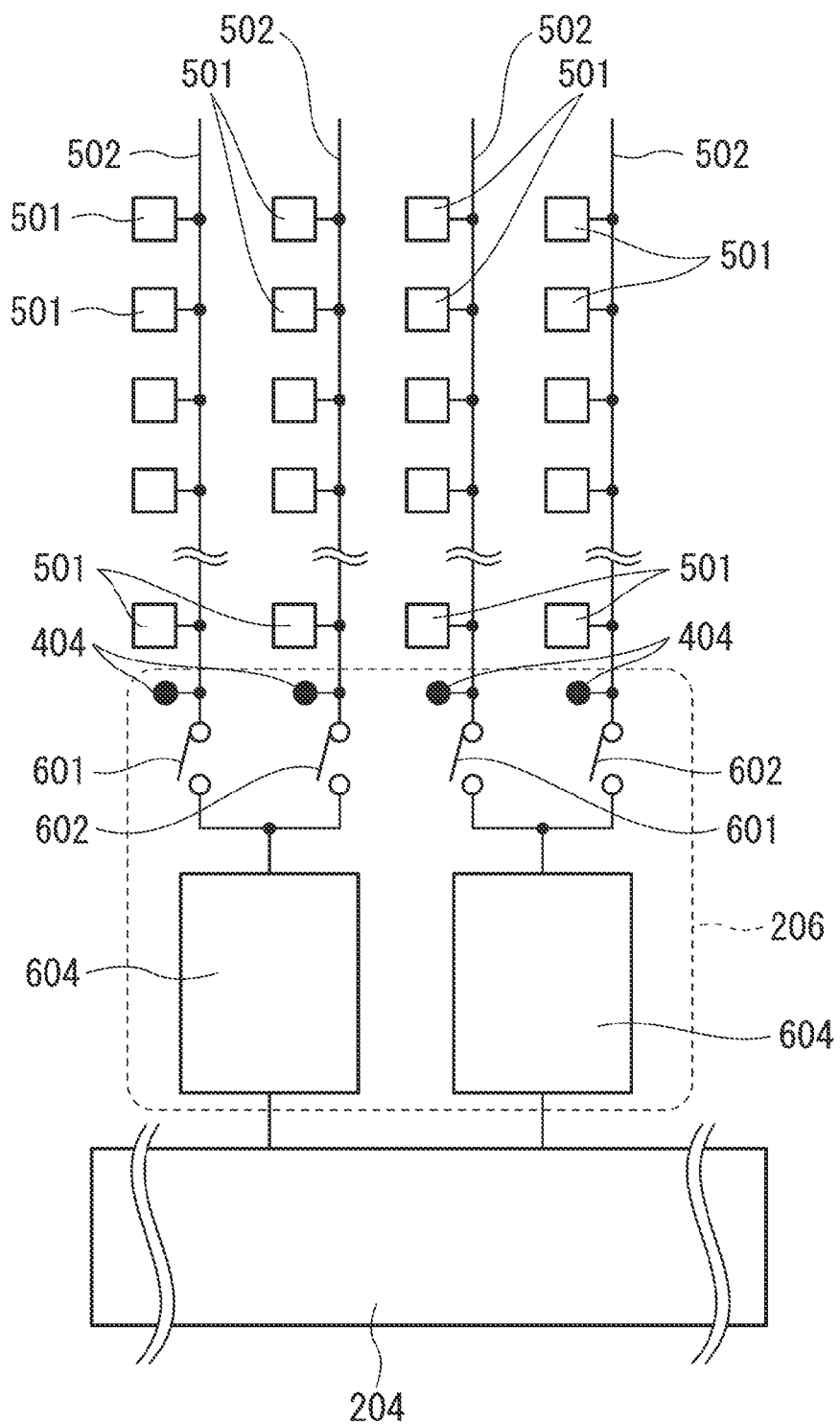
FIG. 6 is a block diagram illustrating connection of circuit elements of a pixel substrate of the solid-state imaging device included in the imaging device according to the embodiment of the present invention.

FIG. 6 is a diagram illustrating connection of the pixel circuits 501, the vertical signal lines 502, the first column circuit unit 206, and the first horizontal scanning circuit 204 in the pixel substrate 201. The first column circuit unit 206 includes the electrode 404 disposed in each column in the array of the pixel circuits 501, a switch 601 disposed in each odd column, and a switch 602 disposed in each even column, and a first column processing circuit 604 disposed every two columns.

The electrode 404 is connected to the vertical signal line 502. One end of the switch 601 is connected to the vertical signal line 502 of an odd column and the other end of the switch 601 is connected to the first column processing circuit 604. One end of the switch 602 is connected to the vertical signal line 502 of an even column and the other end of the switch 602 is connected to the first column processing circuit 604. Changeover between the power ON and OFF of the switches 601 and 602 is controlled by a control signal from the first horizontal scanning circuit 204. Whether the pixel signal output to the vertical signal line 502 of each column is input to the first column processing circuit 604 is controlled through the changeover between the power ON and OFF of the switches 601 and 602. That is, whether the pixel signal output to the vertical signal line 502 of each column is processed by the first column processing circuit 604 is controlled through the changeover between the power ON and OFF of the switches 601 and 602. As described above, the pixel signal can be output directly from the pixel circuit 501 to the vertical signal line 502. In this embodiment, however, processing on the pixel signal output from the pixel circuit 501 to the vertical signal line 502 will not be described. Processing on the pixel signal output from the electrode 404 to the vertical signal line 502 will be described.

Figure 7:
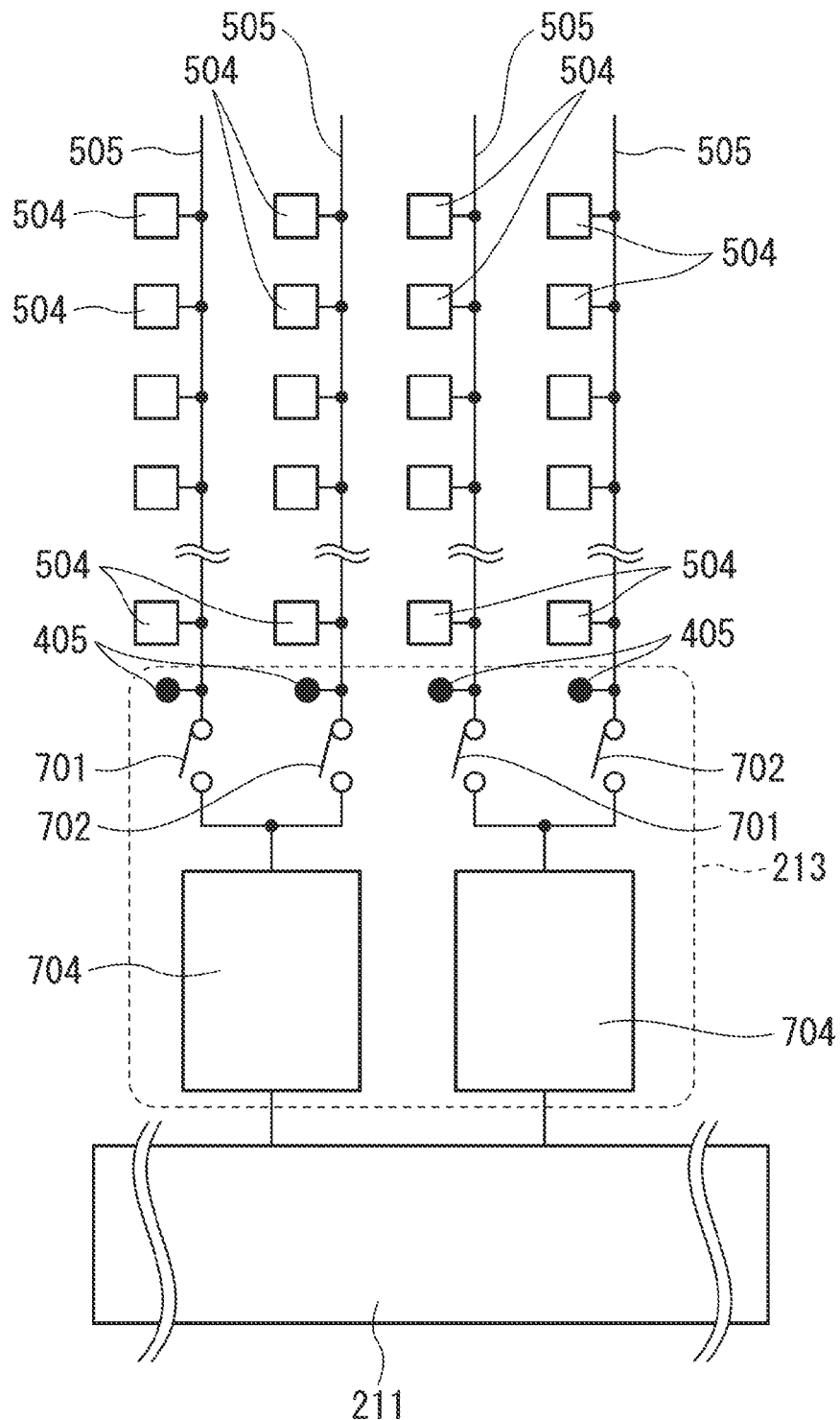
FIG. 7 is a block diagram illustrating connection of circuit elements of a circuit substrate of the solid-state imaging device included in the imaging device according to the embodiment of the present invention.

FIG. 7 is a diagram illustrating connection of the readout circuit 504, the vertical signal line 505, the second column circuit unit 213, and the second horizontal scanning circuit 211 in the circuit substrate 208. The second column circuit unit 213 includes an electrode 405 disposed in each column in the array of the readout circuits 504, a switch 701 disposed in each odd column, and a switch 702 disposed in each even column, and a second column processing circuit 704 disposed every two columns. The first column processing circuit 604 has the same configuration as the second column processing circuit 704. As described above, the electrode 404 formed in the pixel substrate 201 is electrically connected to the electrode 405 formed in the circuit substrate 208 via the microbump 406.

The electrode 405 is connected to the vertical signal line 505. One end of the switch 701 is connected to the vertical signal line 505 of an odd column and the other end of the switch 701 is connected to the second column processing circuit 704. One end of the switch 702 is connected to the vertical signal line 505 of an even column and the other end of the switch 702 is connected to the second column processing circuit 704. Changeover between the power ON and OFF of the switches 701 and 702 is controlled by a control signal from the second horizontal scanning circuit 211. Whether the pixel signal output to the vertical signal line 505 of each column is input to the second column processing circuit 704 is controlled through the changeover between the power ON and OFF of the switches 701 and 702. That is, whether the pixel signal output to the vertical signal line 505 of each column is processed by the second column processing circuit 704 is controlled through the changeover between the power ON and OFF of the switches 701 and 702.

In the circuit substrate 208, the pixel signal output to the vertical signal line 505 is input to the second column processing circuit 704 or is input to the first column processing circuit 604 via the electrodes 404 and 405, the microbump 406, and the vertical signal line 502. Whether the pixel signal is input to the first column processing circuit 604 or the second column processing circuit 704 is determined depending on the states of the switches 601, 602, 701, and 702.

When the switches 701 and 602 are turned on and the switches 702 and 601 are turned off, the pixel signal output from the readout circuit 504 disposed in each odd column is input to the second column processing circuit 704 and the pixel signal output from the readout circuit 504 disposed in each even column is input to the first column processing circuit 604. In this case, the first control signal generation unit 203 and the second control signal generation unit 210 make determinations such that the pixel signal output from the readout circuit 504 disposed in each odd column is processed by the second column processing circuit 704 and the pixel signal output from the readout circuit 504 disposed in each even column is processed by the first column processing circuit 604. Control signals according to the determination contents of the first control signal generation unit 203 and the second control signal generation unit 210 are output to the first horizontal scanning circuit 204 and the second horizontal scanning circuit 211. The first horizontal scanning circuit 204 outputs the control signals configured to turn off the switch 601 and turn on the switch 602 to the switches 601 and 602. The second horizontal scanning circuit 211 outputs the control signals configured to turn on the switch 701 and turn off the switch 702 to the switches 701 and 702.

When the switches 701 and 602 are turned off and the switches 702 and 601 are turned on, a signal output from the readout circuit 504 disposed in each odd column is input to the first column processing circuit 604 and a signal output from the readout circuit 504 disposed in each even column is input to the second column processing circuit 704.

In this case, the first control signal generation unit 203 and the second control signal generation unit 210 make determinations such that the pixel signal output from the readout circuit 504 disposed in each odd column is processed by the first column processing circuit 604 and the pixel signal output from the readout circuit 504 disposed in each even column is processed by the second column processing circuit 704. Control signals according to the determination contents of the first control signal generation unit 203 and the second control signal generation unit 210 are output to the first horizontal scanning circuit 204 and the second horizontal scanning circuit 211. The first horizontal scanning circuit 204 outputs the control signals configured to turn on the switch 601 and turn off the switch 602 to the switches 601 and 602. The second horizontal scanning circuit 211 outputs the control signals configured to turn off the switch 701 and turn on the switch 702 to the switches 701 and 702.

For example, noise suppression processing is performed on the pixel signals input to the first column processing circuit 604 and the second column processing circuit 704 and then, that pixel signals are further amplified. The pixel signal processed by the first column processing circuit 604 is output to the first output unit 205 and the pixel signal processed by the second column processing circuit 704 is output to the second output unit 212.

In this embodiment, as described above, the signal processing corresponding to the pixel circuit 501 and the readout circuit 504 of each column is performed in a distributive manner by the first column circuit unit 206 and the second column circuit unit 213. Accordingly, the signal processing can be performed utilizing the areas of the pixel substrate 201 and the circuit substrate 208 efficiently. As shown in FIGS. 6 and 7, one column processing circuit can be configured in the area corresponding to two columns. Thus, a column processing circuit having a more complicated circuit configuration can be mounted. Alternatively, the restriction on the design of the column processing circuit can be alleviated.

Figure 8:
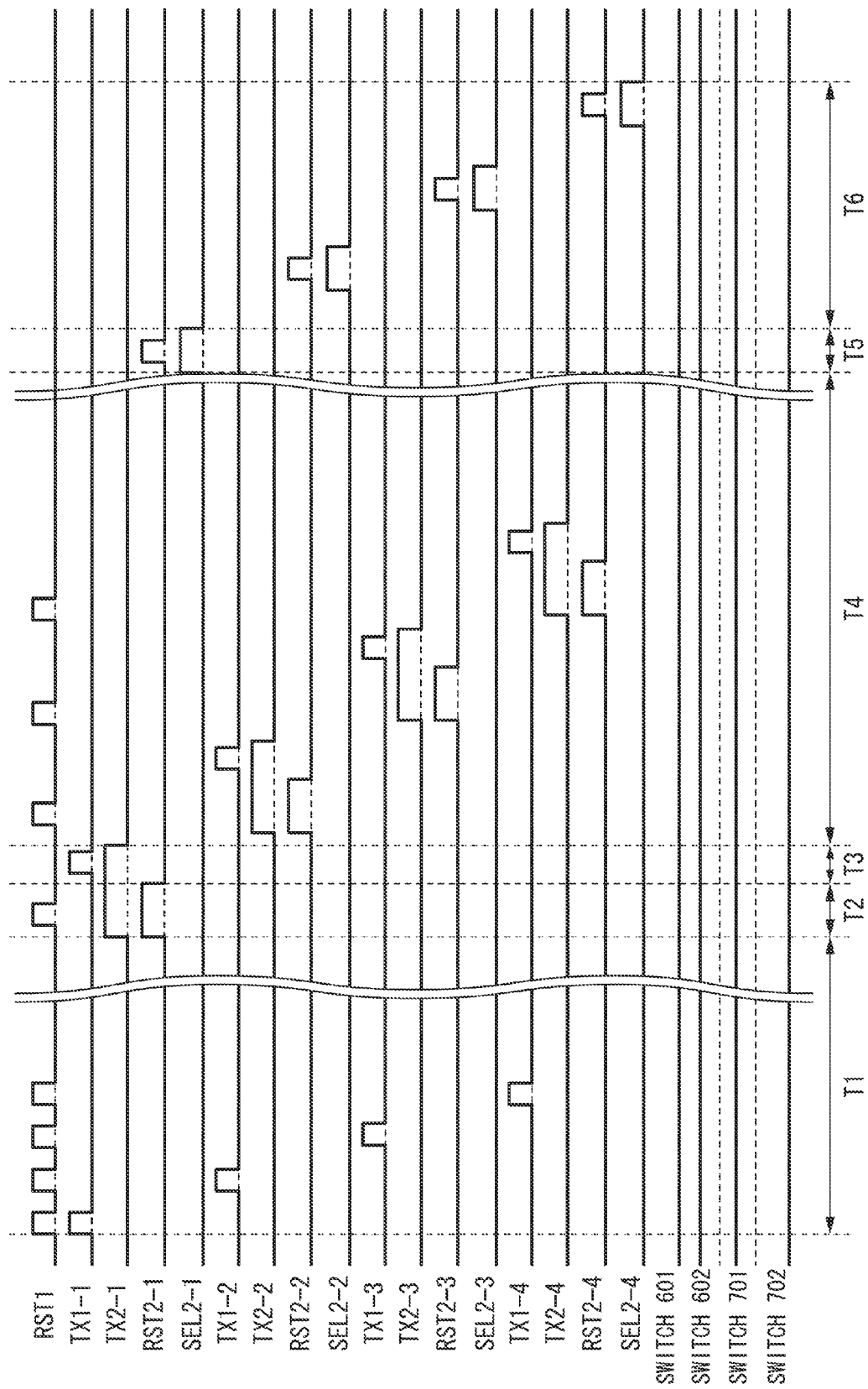
FIG. 8 is a timing chart illustrating a process of the solid-state imaging device of the imaging device according to the embodiment of the present invention.

Next, a process of the solid-state imaging device 102 will be described with reference to FIG. 8. In FIG. 8, the control signals supplied from the first vertical scanning circuit 202 to the pixel circuit 501 and the control signals supplied from the second vertical scanning circuit 209 to the readout circuit 504 correspond to the reference numerals of the circuit elements to which the control signals are supplied. FIG. 8 also shows the control signals output from the first horizontal scanning circuit 204 to the switches 601 and 602 and the control signals output from the second horizontal scanning circuit 211 to the switches 701 and 702. A process shown in FIG. 8 is performed in the pixel circuit 501 and the readout circuit 504 of the same row at a common timing.

The control signal output from the first horizontal scanning circuit 204 to the switch 601 is at an "L" (Low) level and the control signal output from the first horizontal scanning circuit 204 to the switch 602 is at an "H" (High) level. Therefore, the switch 601 is turned off and the switch 602 is turned on. Further, the control signal output from the second horizontal scanning circuit 211 to the switch 701 is at an "H" level and the control signal output from the second horizontal scanning circuit 211 to the switch 702 has "L" level. Therefore, the switch 701 is turned on and the switch 702 is turned off. Thus, the pixel signals output from the readout circuits 504 disposed in each odd column are input to the second column processing circuit 704 and the pixel signals output from the readout circuits 504 disposed in each even column are input to the first column processing circuit 604.

[Process in Period T1]

First, when the control pulse supplied from the first vertical scanning circuit 202 to the first reset transistor RST1 is changed from being at the "L" level to being at the "H" level, the first reset transistor RST1 is turned on. Simultaneously, when the control pulse supplied from the first vertical scanning circuit 202 to the first transfer transistor TX1-1 is changed from being at the "L" level to being at the "H" level, the first transfer transistor TX1-1 is turned on. Thus, the photoelectric conversion element PD1 of the first unit pixel circuit is reset.

Next, the control pulse supplied from the first vertical scanning circuit 202 to the first reset transistor RST1 and the control pulse supplied from the first vertical scanning circuit 202 to the first transfer transistor TX1-1 are changed from being at the level to being at the "L" level. Thus, the first reset transistor RST1 and the first transfer transistor TX1-1 are turned off. Then, the reset of the photoelectric conversion element PD1 of the first unit pixel circuit ends, and exposure (storage of the signal charge) of the first unit pixel circuit starts. As described above, the photoelectric conversion element PD2 of the second unit pixel circuit, the photoelectric conversion element PD3 of the third unit pixel circuit, and the photoelectric conversion element PD4 of the fourth unit pixel circuit are sequentially reset, and thus the exposure of each unit pixel circuit starts.

[Process in Period T2]

Next, when the control pulse supplied from the second vertical scanning circuit 209 to the second reset transistor RST2-1 is changed from being at the "L" level to being at the "H" level, the second reset transistor RST2-1 is turned on. Thus, the analog memory MEM-1 is reset. Simultaneously, when the control pulse supplied from the second vertical scanning circuit 209 to the second transfer transistor TX2-1 is changed from being at the "L" level to being at the "H" level, the second transfer transistor TX2-1 is turned on. Thus, the potential of the other end of the clamp capacitor Cc1 is reset to the power supply voltage VDD and the second transfer transistor TX2-1 starts sampling and holding the potential of the other end of the clamp capacitor Cc1.

Next, when the control pulse supplied from the first vertical scanning circuit 202 to the first reset transistor RST1 is changed from being at the "L" level to being at the "H" level, the first reset transistor RST1 is turned on. Thus, the charge retention unit FD1 is reset. Next, when the control pulse supplied from the first vertical scanning circuit 202 to the first reset transistor RST1 is changed from being at the "H" level to being at the "L" level, the first reset transistor RST1 is turned off.

Thus, the reset of the charge retention unit FD1 ends. The reset timing of the charge retention unit FD1 may be during an exposure period. By resetting the charge retention unit FD1 at the timing immediately before the end of the exposure period, it is possible to further reduce the noise caused due to the leakage current of the charge retention unit FD1.

Next, when the control pulse supplied from the second vertical scanning circuit 209 to the second reset transistor RST2-1 is changed from being at the "H" level to being at the "L" level, the second reset transistor RST2-1 is turned off. Thus, the reset of the analog memory MEM-1 ends. At this time, the clamp capacitor Cc1 clamps the amplified signal (the amplified signal after the reset of the charge retention unit FD1) output from the first amplification transistor SF1.

[Process in Period T3]

First, when the control pulse supplied from the first vertical scanning circuit 202 to the first transfer transistor TX1-1 is changed from being at the "L" level to being at the "H" level, the first transfer transistor TX1-1 is turned on. Thus, the signal charge stored in the photoelectric conversion element PD1 is transmitted to the charge retention unit FD1 via the first transfer transistor TX1-1 and is stored in the charge retention unit FD1. Thus, the exposure (storage of the signal charge) of the first unit pixel circuit ends. A period from the start of the exposure of the first unit pixel circuit during the period T1 to the end of the exposure of the first unit pixel circuit during the period T3 is an exposure period (signal storage period). Next, when the control pulse supplied from the first vertical scanning circuit 202 to the first transfer transistor TX1-1 is changed from being at the "H" level to being at the "L" level, the first transfer transistor TX1-1 is turned off.

Next, when the control pulse supplied from the second vertical scanning circuit 209 to the second transfer transistor TX2-1 is changed from being at the "H" level to being at the level, the second transfer transistor TX2-1 is turned off. Thus, the second transfer transistor TX2-1 ends the sampling and holding of the potential of the other end of the clamp capacitor Cc1.

[Process in Period T4]

The processes performed during the above-described periods T2 and T3 are processes of the first unit pixel circuit and the first unit readout circuit. During a period T4, the same processes as those performed during the periods T2 and T3 are performed in the second unit pixel circuit and the second unit readout circuit, the third unit pixel circuit and the third unit readout circuit, and the fourth unit pixel circuit and the fourth unit readout circuit. In FIG. 8, the lengths of the exposure periods of the unit pixel circuits differ from each other due to the space constraint in the drawing, but the lengths of the exposure periods of the unit pixel circuits are more preferably the same as each other.

Hereinafter, a change in the potential of one end of the analog memory MEM-1 will be described. The same applies to a change in the potential of one end of each of the analog memories MEM-2, MEM-3, and MEM-4. It is assumed that $\Delta Vfd$ is a change in the potential of one end of the charge retention unit FD1 when the signal charge is transmitted from the photoelectric conversion element PD1 to the charge retention unit FD1 after the end of the reset of the charge retention unit FD1. It is assumed that $\alpha 1$ is the gain of the first amplification transistor SF1. Then, a change $\Delta Vamp1$ in the potential of the source terminal of the first amplification transistor SF1 is $\alpha 1 \times \Delta Vfd$ when the signal charge is transmitted from the photoelectric conversion element PD1 to the charge retention unit FD1.

It is assumed that $\alpha 2$ is a total of the gains of the analog memory MEM-1 and the second transfer transistor TX2-1. A change $\Delta Vmem$ in the potential of one end of the analog memory MEM-1 when the second transfer transistor TX2-1 samples and holds the signal charge after the transmission of the signal charge from the photoelectric conversion element PD1 to the charge retention unit FD1 is $\alpha 2 \times \Delta Vamp1$, that is, $\alpha 1 \times \alpha 2 \times \Delta Vfd$. Here, $\Delta Vfd$ is a change in the amount of potential of one end of the charge retention unit FD1 when the signal charge is transmitted. Further, $\Delta Vfd$ does not contain reset noise occurring when the charge retention unit FD1 is reset. Accordingly, it is possible to reduce the influence of the noise occurring in the circuit substrate 208 by the second transfer transistors TX2-1, TX2-2, TX2-3, and TX2-4 performing the sampling and holding.

The potential of one end of the analog memory MEM-1 is the power supply voltage VDD when the reset of the analog memory MEM-1 ends. The potential Vmem of one end of the analog memory MEM-1 sampled and held by the second transfer transistor TX2-1 after the transmission of the signal charge from the photoelectric conversion element PD1 to the charge retention unit FD1 satisfies Equation (1) below. In Equation (1), $\Delta Vmem < 0$ and $\Delta Vfd < 0$.

$$Vmem = VDD + \Delta Vmem \quad (1)$$
$$= VDD + \alpha 1 \times \alpha 2 \times \Delta Vfd$$

Here, $\alpha 2$ satisfies Equation (2). In Equation (2), CL is the capacitance value of the clamp capacitor Cc1 and CSH is the capacitance value of the analog memory MEM-1. To further suppress deterioration in a gain, the capacitance value CL of the clamp capacitor Cc1 is more preferably larger than the capacitance value CSH of the analog memory MEM-1.

$$\alpha 2 = \frac{CL}{CL + CSH} \quad (2)$$

[Process in Period T5]

During a period T5, signals based on the signal charges stored in the analog memories MEM-1, MEM-2, MEM-3, and MEM-4 are sequentially read out. First, a signal is read out from the first unit pixel circuits. When the control pulse supplied from the second vertical scanning circuit 209 to the second select transistor SEL2-1 is changed from the "L" level to the "H" level, the second select transistor SEL2-1 is turned on. Thus, the signal based on the potential Vmem expressed in Equation (1) is output to the vertical signal line 505 via the second select transistor SEL2-1.

Next, when the control pulse supplied from the second vertical scanning circuit 209 to the second reset transistor RST2-1 is changed from the "L" level to the "H" level, the second reset transistor RST2-1 is turned on. Thus, the analog memory MEM-1 is reset and the signal based on the potential of one end of the analog memory MEM-1 when the analog memory MEM-1 is reset is output to the vertical signal line 505 via the second select transistor SEL2-1.

Next, when the control pulse supplied from the second vertical scanning circuit 209 to the second reset transistor RST2-1 is changed from the "H" level to the "L" level, the second reset transistor RST2-1 is turned off. Next, when the control pulse supplied from the second vertical scanning circuit 209 to the second select transistor SEL2-1 is changed from the "H" level to the "L" level, the second select transistor SEL2-1 is turned off.

The first column processing circuit 604 and the second column processing circuit 704 generate a difference signal having a difference between the signal, which is based on the potential Vmem expressed in Equation (1), and the signal, which is based on the potential of one end of the analog memory MEM-1 when the analog memory MEM-1 is reset. The difference signal is a signal that is based on a difference between the potential Vmem expressed in Equation (1) and the power supply voltage VDD. The difference signal is a signal that is based on the difference $\Delta Vfd$ between the potential of one end of the charge retention unit FD1 immediately after the transmission of the signal charge stored in the photoelectric conversion element PD1 and the potential of the charge retention unit FD1 immediately after the reset of one end of the charge retention unit FD1.

Accordingly, it is possible to obtain a signal component in which a noise component occurring in the reset of the analog memory MEM-1 and a noise component occurring in the reset of the charge retention unit FD1 are suppressed and which is based on the signal charge stored in the photoelectric conversion element PD1.

A signal (the pixel signal output from the readout circuit 504 disposed in the even column) output from the first column processing circuit 604 is output to the first output unit 205 by the first horizontal scanning circuit 204, and then is output from the first output unit 205 to the outside of the solid-state imaging device 102. Further, a signal (the pixel signal output from the readout circuit 504 disposed in the odd column) output from the second column processing circuit 704 is output to the second output unit 212 by the second horizontal scanning circuit 211, and then is output from the second output unit 212 to the outside of the solid-state imaging device 102. Then, the process of reading out the signal from the first unit readout circuit ends.

[Process in Period T6]

Next, the second unit readout circuit, the third unit readout circuit, and the fourth unit readout circuit perform the same process as the first unit readout circuit during the period T5.

In the above-described process, the signal charges transmitted from the photoelectric conversion elements PD1, PD2, PD3, and PD4 to the charge retention unit FD1 should be retained up to a readout timing of each unit pixel circuit by the charge retention unit FD1. When noise occurs during the period in which the charge retention unit FD1 retains the signal charge, the noise is superimposed on the signal charge retained by the charge retention unit FD1, and thus a signal quality (S/N) may deteriorate.

The main factors of the noise occurring during the period (hereinafter referred to as a retention period) in which the charge retention unit FD1 retains the signal charge are a charge (hereinafter referred to as a leakage charge) produced by the leakage current of the charge retention unit FD1 and a charge (hereinafter referred to as a photocharge) produced by light incident on a portion other than the photoelectric conversion elements PD1, PD2, PD3, and PD4. It is assumed that qid and qpn are the leakage charge and the photocharge produced in a unit time, respectively, and tc is the length of the retention period. A noise charge Qn generated during the retention period is (qid+qpn)tc.

It is assumed that Cfd is the capacitance of the charge retention unit FD1 and Cmem is the capacitance of the analog memories MEM-1, MEM-2, MEM-3, and MEM-4. It is assumed that A is a ratio (Cmem/Cfd) of Cmem to Cfd. As described above, it is assumed that $\alpha 1$ is the gain of the first amplification transistor ST1. It is assumed that $\alpha 2$ is a total of the gains of the analog memories MEM-1, MEM-2, MEM-3, and MEM-4 and the second transfer transistors TX2-1, TX2-2, TX2-3, and TX2-4. It is assumed that Qph is the signal charge generated by the photoelectric conversion elements PD1, PD2, PD3, and PD4 during the exposure period. Then, the signal charge retained in the analog memories MEM-1, mem-2, MEM-3, and MEM-4 after the end of the exposure period is $A \times \alpha 1 \times \alpha 2 \times Qph$.

The signals that are based on the signal charges transmitted from the photoelectric conversion elements PD1, PD2, PD3, and PD4 to the charge retention unit FD1 are sampled and held by the second transfer transistors TX2-1, TX2-2, TX2-3, and TX2-4 and are stored in the analog memories MEM-1, MEM-2, MEM-3, and MEM-4. Accordingly, a time taken from the transmission of the signal charges in the charge retention unit FD1 to the storage of the signal charges in the analog memories MEM-1, MEM-2, MEM-3, and MEM-4 is short, and the noise occurring in the charge retention unit FD1 can be ignored. When it is assumed that Qn is the noise occurring during the period in which the analog memories MEM-1, MEM-2, MEM-3, and MEM-4 retain the signal charges, as described above, S/N is $A \times \alpha 1 \times \alpha 2 \times Qph/Qn$.

On the other hand, S/N is Qph/Qn when the signal charges retained in a capacitance storage unit are read out from the pixels via the amplification transistors. Accordingly, S/N of this embodiment is $A \times \alpha 1 \times \alpha 2$ times S/N obtained at the time of reading out the signal charges retained in the capacitance storage unit from the pixels via the amplification transistors. It is possible to reduce the deterioration in the signal quality by setting the capacitance values of the analog memories MEM-1, MEM-2, MEM-3, and MEM-4 so that $A \times \alpha 1 \times \alpha 2$ is larger than 1 (for example, the capacitance values of the analog memories MEM-1, MEM-2, MEM-3, and MEM-4 are set to be sufficiently larger than the capacitance value of the charge retention unit FD1).

In this embodiment, one first column processing circuit 604 is disposed in every plurality of columns in the array of the pixel circuit 501, and one second column processing circuit 704 is disposed in every plurality of columns in the array of the readout circuit 504, but the present invention is not limited thereto. For example, one first column processing circuit 604 may be disposed in each column in the array of the pixel circuit 501. One second column processing circuit 704 may be disposed in each column in the array of the readout circuit 504. Thus, by operating the pixel substrate 201 and the circuit substrate 208 simultaneously in parallel, it is possible to obtain two types of pixel signals: the pixel signal (for example, a moving image signal) output from the first output unit 205 of the pixel substrate 201 and the pixel signal (for example, a still image signal) output from the second output unit 212 of the circuit substrate 208.

In this embodiment, as shown in FIGS. 6 and 7, the number of columns is four. The number of column circuit units is two (one first column circuit unit 206 and one second column circuit unit 213). Accordingly, each column circuit unit performs signal processing corresponding to two columns. However, the present invention is not limited thereto. When the number of columns is N (where N is an integer equal to or greater than 2 and is a number divisible by M which is an integer equal to or greater than 2) and the number of column circuit units is M, each column circuit unit may perform signal processing corresponding to N/M columns. For example, when the number of columns is eight and the number of column circuit units is two, one column circuit unit performs signal processing corresponding to four columns. In this case, one first column processing circuit 604 and one second column processing circuit 704 may be disposed in every two columns, as in FIGS. 6 and 7.

In this embodiment, the solid-state imaging device having the configuration in which two substrates are connected to each other by the connection portions has been described. However, three or more substrates may be connected by the connection portions. In a solid-state imaging device to which this embodiment is applied, the photoelectric conversion elements are disposed in one of three or more substrates and the column circuit units are disposed in each of the plurality of substrates (which may include a substrate in which the photoelectric conversion elements are disposed) among the three or more substrates.

In the solid-state imaging device according to this embodiment, as described above, the signal processing corresponding to the pixels (the pixel circuits 501) of each column in the pixel unit (the pixel array unit 207) is performed in a distributive manner by the column circuit units (the first column circuit unit 206 and the second column circuit unit 213) disposed in other substrates (the pixel substrate 201 and the circuit substrate 208). Thus, the areas of the plurality of substrates can be efficiently utilized.

Since one column processing circuit can be configured in the area corresponding to two columns, the column processing circuit having a more complicated circuit configuration can be mounted. Alternatively, the restriction on the design of the column processing circuit can be alleviated.

The following advantages can be obtained by turning on and off the plurality of switches (the switches 601, 602, 701, and 702) to change over the pixel signals of the columns input to the plurality of column processing circuits (the first column processing circuit 604 and the second column processing circuit 704). For example, the solid-state imaging device is configured to perform a process of switching a first mode in which the pixel signals of all the columns are processed and a second mode in which the pixel signal of only some of the columns are processed. In the second mode, when the pixel signal of one column is processed per two columns, the pixel signal of the column to be processed is enabled to be input to one of the first column processing circuit 604 and the second column processing circuit 704 and the pixel signal of the column not to be processed is enabled not to be input to the first column processing circuit 604 and the second column processing circuit 704. For example, when only the switch 601 is turned on and the switches 602, 701, and 702 are turned off, the pixel signal of the odd column is input to the first column processing circuit 604 and the pixel signal of the even column is not input to the first column processing circuit 604 and the second column processing circuit 704. Thus, since the process of the second column processing circuit 704 can be stopped, the power consumption can be reduced compared to the first mode.

The deterioration in the signal quality can be suppressed by providing an analog memory that stores an amplified signal output from the first amplification transistor.

Some of the circuit elements are shared by the plurality of unit pixel circuits and unit readout circuits. Accordingly, the chip area can be reduced, compared to a case in which the circuit elements are not shared by the plurality of unit pixel circuits and unit readout circuits. Further, the first amplification transistor and the second current source are shared by the plurality of unit pixel circuits and unit readout circuits. Accordingly, the number of current sources simultaneously operating can be reduced. Therefore, it is possible to reduce the occurrence of a voltage drop of the power supply voltage or a rise of a GND (ground) voltage by simultaneously operating the plurality of current sources.

Since the area of the photoelectric conversion element in the first substrate (the pixel substrate 201) is capable of being configured to be larger, compared to a case in which all of the circuit elements are disposed in one substrate, sensitivity is improved. Further, by using the analog memories, it is possible to reduce the area of a region for the signal storage formed in the second substrate (the circuit substrate 208).

The capacitance value of the analog memory is configured to be larger than the capacitance value of the charge retention unit (for example, the capacitance value of the analog memory is five times or more the capacitance value of the charge retention unit). Thus, the signal charge retained by the analog memory is larger than the signal charge retained by the charge retention unit. Therefore, it is possible to reduce the influence of signal deterioration caused due to the leakage current of the analog memory.

The influence of the noise occurring in the first substrate can be reduced by providing the clamp capacitor and the second transfer transistor. As the noise occurring in the first substrate, there is noise (for example, reset noise) originating from the process of a circuit (for example, the first reset transistor) connected to the first amplification transistor and occurring in an input portion of the first amplification transistor. As the noise occurring in the first substrate, there is also noise or the like (for example, noise caused due to a variation in a circuit threshold value of the first amplification transistor) originating from the process characteristics of the first amplification transistor.

The influence of the noise occurring in the second substrate can be reduced by outputting a signal at the time of resetting the analog memory and a signal from the unit readout circuit in a time division manner according to a change in the output of the first amplification transistor occurring in the transmission of the signal charge from the photoelectric conversion element to the charge retention unit and performing difference processing on each signal outside the unit readout circuit. As the noise occurring in the second substrate, there is noise (for example, reset noise) originating from the process of a circuit (for example, the second reset transistor) connected to the second amplification transistor and occurring in an input portion of the second amplification transistor.

A pixel unit according to the present invention corresponds to, for example, the pixel array unit 207. A column circuit unit according to the present invention corresponds to, for example, the first column circuit unit 206 and the second column circuit unit 213. An output unit according to the present invention corresponds to, for example, the first output unit 205 and the second output unit 212. A changeover unit according to the present invention corresponds to, for example, the switches 601, 602, 701, and 702. A column signal line according to the present invention corresponds to, for example, the vertical signal lines 502 and 505. A signal storage unit according to the present invention corresponds to, for example, the analog memories MEM-1, MEM-2, MEM-3, and MEM-4.

The embodiment of the present invention has been described in detail with reference to the drawings. However, the specific configurations are not limited to the above-described embodiment, but include modifications of the design within the scope of the present invention without departing from the gist of the present invention.

For example, a solid-state imaging device according to an aspect of the present invention may be "a solid-state imaging device in which $1^{st}$ to $n^{th}$ (where n is an integer equal to or greater than 2) substrates are electrically connected to each other via a connection portion, the solid-state imaging device including: a pixel unit in which pixels each including a photoelectric conversion element are arrayed in a matrix form; a column circuit unit that includes a plurality of column processing device which are disposed in correspondence with columns of the pixels in the pixel unit and perform signal processing on a signal generated by the photoelectric conversion element included in the pixel of the corresponding column; and an output unit that outputs the signal processed by the column processing device to the outside of the solid-state imaging device, wherein the pixel unit is disposed in the $1^{st}$ substrate, wherein the column circuit unit is disposed in each of at least two or more different substrates of the $1^{st}$ to $n^{th}$ substrates, and wherein the signal processing corresponding to the pixel of each column in the pixel unit is performed in a distributive manner by the column circuit units disposed in at least the two or more different substrates."

For example, a solid-state imaging device according to another aspect of the present invention may be "a solid-state imaging device in which $1^{st}$ to $n^{th}$ (where n is an integer equal to or greater than 2) substrates are electrically connected to each other via a connection portion, the solid-state imaging device including: a pixel unit in which pixels each including a photoelectric conversion element are arrayed in a matrix form; a column circuit unit that includes a plurality of column processing device which are disposed in correspondence with columns of the pixels in the pixel unit, are each connected to a column signal line connected to the pixel for each column in the pixel unit, and perform signal processing on a signal generated by the photoelectric conversion element included in the pixel of the corresponding column; an output unit that outputs the signal processed by the column processing device to the outside of the solid-state imaging device; and a changeover unit that is disposed between the column signal line and the column processing device and performs control of whether a signal is input to the column processing device, wherein the pixel unit is disposed in the $1^{st}$ substrate, and wherein the column circuit unit is disposed in each of at least two or more different substrates of the $1^{st}$ to $n^{th}$ substrates."

For example, an imaging device according to still another aspect of the present invention may be "an imaging device in which $1^{st}$ to $n^{th}$ (where n is an integer equal to or greater than 2) substrates are electrically connected to each other via a connection portion, the solid-state imaging device including: a pixel unit in which pixels each including a photoelectric conversion element are arrayed in a matrix form; a column circuit unit that includes a plurality of column processing device which are disposed in correspondence with columns of the pixels in the pixel unit and perform signal processing on a signal generated by the photoelectric conversion element included in the pixel of the corresponding column; and an output unit that outputs the signal processed by the column processing device to the outside of the solid-state imaging device, wherein the pixel unit is disposed in the $1^{st}$ substrate, wherein the column circuit unit is disposed in each of at least two or more different substrates of the $1^{st}$ to $n^{th}$ substrates, and wherein the signal processing corresponding to the pixel of each column in the pixel unit is performed in a distributive manner by the column circuit units disposed in at least the two or more different substrates."

For example, an imaging device according to further still another aspect of the present invention may be "an imaging device in which $1^{st}$ to $n^{th}$ (where n is an integer equal to or greater than 2) substrates are electrically connected to each other via a connection portion, the solid-state imaging device including: a pixel unit in which pixels each including a photoelectric conversion element are arrayed in a matrix form; a column circuit unit that includes a plurality of column processing device which are disposed in correspondence with columns of the pixels in the pixel unit, are each connected to a column signal line connected to the pixel for each column in the pixel unit, and perform signal processing on a signal generated by the photoelectric conversion element included in the pixel of the corresponding column; an output unit that outputs the signal processed by the column processing device to the outside of the solid-state imaging device; and a changeover unit that is disposed between the column signal line and the column processing device and performs control of whether a signal is input to the column processing device wherein the pixel unit is disposed in the $1^{st}$ substrate, and wherein the column circuit unit is disposed in each of at least two or more different substrates of the $1^{st}$ to $n^{th}$ substrates."

A computer program product realizing any combination of the constituent elements and the processes described above is also effective as an aspect of the present invention. The computer program product refers to a recording medium, a device, a machine, or a system in which a program code is embedded, such as a recording medium (a DVD medium, a hard disk medium, a memory medium, and the like) recording a program code, a computer recording the program code, or an Internet system (for example, a system including a server and a client terminal) recording the program code. In this case, the constituent elements and the processes described above are mounted as modules and the program code formed by the mounted modules is recorded in the computer program product.

For example, the computer program product according to other aspect of the present invention may be "a computer program product recording a program code causing a computer to execute reading out a signal from each pixel of a solid-state imaging device in which $1^{st}$ to $n^{th}$ (where n is an integer equal to or greater than 2) substrates are electrically connected to each other via a connection portion, which includes a pixel unit in which the pixels each including a photoelectric conversion element are arrayed in a matrix form, a column circuit unit that includes a plurality of column processing circuits which are disposed in correspondence with columns of the pixels in the pixel unit, are each connected to a column signal line connected to the pixel for each column in the pixel unit, and perform signal processing on a signal generated by the photoelectric conversion element included in the pixel of the corresponding column, and an output unit that outputs the signal processed by the column processing circuit to the outside of the solid-state imaging device, and a switch that is disposed between the column signal line and the column processing circuit and performs control of whether the signal is input to the column processing circuit through changeover between power ON and power OFF, and in which the pixel unit is disposed in the $1^{st}$ substrate and the column circuit unit is disposed in each of at least two or more different substrates of the $1^{st}$ to $n^{th}$ substrates where n is an integer equal to or greater than 2, the program code including: a module causing the photoelectric conversion element to generate the signal; a module inputting the signal generated by the photoelectric conversion element to the column processing circuit corresponding to the column of the pixel including this photoelectric conversion element via the switch; and a module outputting the signal processed by the column processing circuit from the output unit to the outside of the solid-state imaging device."

A program realizing any combination of the constituent elements and the processes in the above described embodiment is also effective as an aspect of the present invention. The objects of the present invention can be achieved by recording the program in a computer-readable recording medium, causing a computer to read the program recorded on the recording medium, and executing the program.

Here, the "computer" includes home page providing environments (or display environments) when a WWW system is used. Further, the "computer-readable recording medium" refers to a transportable medium such as a flexible disk, a magneto-optical disc, a ROM, and a CD-ROM or a storage device such as a hard disk included in a computer. Furthermore, the "computer-readable recording medium" includes a medium that holds the program for a given time, such as a volatile memory (RAM) included in a computer system serving as a server or a client when the program is transmitted via a network such as the Internet or a communication link such as a telephone link.

The above-described program may be transmitted from a computer storing the program in a storage device or the like to another computer via a transmission medium or by transmission waves in a transmission medium. Here, the "transmission medium" transmitting the program refers to a medium that has a function of transmitting information, such as a network (communication network) such as the Internet or a communication link (communication line) such as a telephone link. The above-described program may be a program configured to realize some of the above-described functions. Further, the program may be a so-called difference file (difference program) in which the above-described functions are realized by combination with a program already recorded in a computer.

The preferred embodiments of the present invention have been described, but various substitutions, modifications, or equivalents can be used as the above-described constituent elements or processes. In the embodiments disclosed in the present specification, a single component may be substituted with a plurality of components or a plurality of components may be substituted with a single component in order to perform one or a plurality of the functions. The substitutions are within the scope of the present invention excluding a case in which the substitution does not appropriately operate to achieve the objects of the present invention. Accordingly, the scope of the present invention is not determined with reference to the above description, but should be determined by the claims, and the entire scope of equivalents is also included. In the claims, one or more of each constituent element may be included, unless explicitly stated otherwise. The claims should not be construed as inclusion of the limitation of a means-plus-function, excluding a case in which a phrase "means for" is explicitly written in the claims.

Although a preferable embodiment of the present invention has been described thereto, the present invention is not limited to the embodiment. Additions, omissions, substitutions, and other modifications can be made without departing from the scope of the present invention. The present invention is not limited to the above description, but is limited only by the scope of the accompanying claims.

What is claimed is:

1. A solid-state imaging device comprising:
   1st to n-th substrates, which are electrically connected to each other via a connection portion, where n is an integer equal to or greater than 2;
   a plurality of pixels, which is disposed in the 1st substrate in a matrix form, and each of which includes a photoelectric conversion element;
   a plurality of upper vertical lines disposed in the 1st substrate, and electrically connected to pixels in a first column of the plurality of pixels;
   a plurality of readout circuits, which is disposed in at least one of the 2nd to n-th substrates in a matrix form, and each of which stores a readout signal corresponding to a pixel output of the plurality of pixels;
   a plurality of lower vertical lines disposed in the one of the 2nd to n-th substrates, and electrically connected to readout circuits in a first column of the plurality of readout circuits;
   a plurality of first column processing circuits, which is disposed in 1st substrate, each of which is disposed in correspondence with the plurality of upper vertical lines, and each of which performs signal processing on at least one of the pixel output and the readout signal;
   a plurality of second column processing circuits, which is disposed in the one of 2nd to n-th substrates, each of which is disposed in correspondence with the plurality of lower vertical lines, and each of which performs signal processing on at least one of the pixel output and the readout signal;
   a plurality of switch portions, which is disposed in correspondence with the plurality of first column processing circuits or the plurality of second column processing circuits, and each of which is configured to select from:
      a first connection between:
         one of the first column processing circuits and the second column processing circuits, and
         one of a first upper vertical line and a first lower vertical line,
            wherein the first upper vertical line is one of the plurality of upper vertical lines, and
            wherein the first lower vertical line is one of the plurality of lower vertical lines; and
      a second connection between:
         the other of the first column processing circuits and the second column processing circuits, and
         one of a second upper vertical line and a second lower vertical line,
            wherein the second upper vertical line is another of the plurality of upper vertical lines, and
            wherein the second lower vertical line is another of the plurality of lower vertical lines; and
   an output unit that outputs the signal processed by the first column processing circuit and the second column processing circuit to the outside of the solid-state imaging device.

2. The solid-state imaging device according to claim 1, wherein, on the assumption that N is the number of columns of the plurality of pixels, M is the number of the plurality of first column circuits, and the plurality of second column circuits, each of the plurality of first column circuit and the plurality of the second column circuit performs the signal processing corresponding to N/M columns, where N is an integer equal to or greater than 2 and is a number divisible by M which is an integer equal to or greater than 2.

3. The solid-state imaging device according to claim 1,
   wherein one of the plurality of first column processing circuits is connected to the pixels of N columns in the plurality of pixels, and
   wherein one of the plurality of second column processing circuits circuit is connected to the pixels of N columns in the plurality of pixels.

4. The solid-state imaging device according to claim 1, wherein the plurality of switch portion inputs the signal to the column processing circuit for the column determined as a processing target in the column processing circuit and does not input the signal to the column processing circuit for the column not determined as the processing target in the column processing circuit.

5. The solid-state imaging device according to claim 1,
   wherein one column processing circuit is connected to N column signal lines, and
   wherein the changeover unit is disposed between each of the N column signal lines and one column processing circuit, where N is an integer equal to or greater than 2.

6. An imaging device comprising:
   1st to n-th substrates, which are electrically connected to each other via a connection portion, where n is an integer equal to or greater than 2;
   a plurality of pixels, which is disposed in the 1st substrate in a matrix form, and each of which includes a photoelectric conversion element;
   a plurality of readout circuits, which is disposed in at least one of the 2nd to n-th substrates in a matrix form, and each of which stores a readout signal corresponding to a pixel output of the plurality of pixels;
   a plurality of first column processing circuits, which is disposed in 1st substrate, each of which is disposed in correspondence with columns of the plurality of pixels, and each of which performs signal processing on at least one of the pixel output and the readout signal;
   a plurality of second column processing circuits, which is disposed in the one of 2nd to n-th substrates, each of which is disposed in correspondence with columns of the plurality of readout circuits, and each of which performs signal processing on at least one of the pixel output and the readout signal;
   a plurality of switch portions, which is disposed in correspondence with the plurality of first column processing circuits or the plurality of second column processing circuits, and each of which is capable of connecting at least one of the plurality of pixels and the plurality of readout circuits to both of the plurality of first column processing circuits and the plurality of second column processing circuits, based on the signal processing; and an output unit that outputs the signal processed by the first column processing circuit and the second column processing circuit to the outside of the solid-state imaging device.

7. An imaging device comprising:
1st to n-th substrates, which are electrically connected to each other via a connection portion, where n is an integer equal to or greater than 2;
a plurality of pixels, which is disposed in the 1st substrate in a matrix form, and each of which includes a photoelectric conversion element;
a plurality of readout circuits, which is disposed in at least one of the 2nd to n-th substrates in a matrix form, and each of which stores a readout signal corresponding to a pixel output of the plurality of pixels;
a plurality of first column processing circuits, which is disposed in 1st substrate, each of which is disposed in correspondence with columns of the plurality of pixels, and connected to a column signal line, and each of which performs signal processing on at least one of the pixel output and the readout signal;
a plurality of second column processing circuits, which is disposed in the one of 2nd to n-th substrates, each of which is disposed in correspondence with columns of the plurality of readout circuits, and each of which performs signal processing on at least one of the pixel output and the readout signal;
a plurality of switch portions, which is disposed in correspondence with the plurality of first column processing circuits or the plurality of second column processing circuits, and each of which is capable of connecting at least one of the plurality of pixels and the plurality of readout circuits to both of the plurality of first column processing circuits and the plurality of second column processing circuits, based on the signal processing; and
an output unit that outputs the signal processed by the first column processing circuit and the second column processing circuit to the outside of the solid-state imaging device.

8. A signal readout method of reading out a signal from each pixel of a solid-state imaging device, which includes 1st to n-th substrates, which are electrically connected to each other via a connection portion, where n is an integer equal to or greater than 2, a plurality of pixels, which is disposed in the 1st substrate in a matrix form, and each of which includes a photoelectric conversion element, a plurality of readout circuits, which is disposed in at least one of the 2nd to n-th substrates in a matrix form, and each of which stores a readout signal corresponding to a pixel output of the plurality of pixels, a plurality of first column processing circuits, which is disposed in 1st substrate, each of which is disposed in correspondence with columns of the plurality of pixels, and each of which performs signal processing on at least one of the pixel output and the readout signal, a plurality of second column processing circuits, which is disposed in the one of 2nd to n-th substrates, each of which is disposed in correspondence with columns of the plurality of readout circuits, and each of which performs signal processing on at least one of the pixel output and the readout signal, a plurality of switch portions, which is disposed in correspondence with the plurality of first column processing circuits or the plurality of second column processing circuits, and each of which is capable of connecting at least one of the plurality of pixels and the plurality of readout circuits to both of the plurality of first column processing circuits and the plurality of second column processing circuits, based on the signal processing, and an output unit that outputs the signal processed by the first column processing circuit and the second column processing circuit to the outside of the solid-state imaging device, the signal readout method comprising:
a step of causing the photoelectric conversion element to generate the signal;
a step of inputting the signal generated by the photoelectric conversion element to the column processing circuit corresponding to the column of the pixel including the photoelectric conversion element via the switch; and
a step of outputting the signal processed by the column processing circuit from the output unit to the outside of the solid-state imaging device.

* * * * *